US009236607B2

(12) United States Patent
Wang et al.

(10) Patent No.: US 9,236,607 B2
(45) Date of Patent: Jan. 12, 2016

(54) METHOD FOR MAKING LITHIUM ION BATTERY CATHODE

(75) Inventors: Jia-Ping Wang, Beijing (CN); Shu Luo, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 103 days.

(21) Appl. No.: 13/340,585

(22) Filed: Dec. 29, 2011

(65) Prior Publication Data
US 2013/0106026 A1 May 2, 2013

(30) Foreign Application Priority Data

Oct. 28, 2011 (CN) .......................... 2011 1 0333540

(51) Int. Cl.
*H01M 4/13* (2010.01)
*H01M 4/139* (2010.01)
*H01M 4/62* (2006.01)
*H01M 4/131* (2010.01)
*H01M 10/0525* (2010.01)

(52) U.S. Cl.
CPC ................ *H01M 4/139* (2013.01); *H01M 4/13* (2013.01); *H01M 4/625* (2013.01); *H01M 4/131* (2013.01); *H01M 10/0525* (2013.01); *Y02E 60/122* (2013.01)

(58) Field of Classification Search
USPC .......................................................... 264/442
See application file for complete search history.

(56) References Cited

U.S. PATENT DOCUMENTS

| 6,314,638 | B1* | 11/2001 | Kaido et al. | 29/730 |
| 6,346,023 | B1* | 2/2002 | Tsuboi et al. | 445/46 |
| 6,555,411 | B1* | 4/2003 | Bao et al. | 438/99 |
| 2008/0241695 | A1* | 10/2008 | Song et al. | 429/231.8 |
| 2009/0098453 | A1 | 4/2009 | Liu et al. | |
| 2009/0153516 | A1* | 6/2009 | Liu et al. | 345/173 |
| 2009/0298239 | A1* | 12/2009 | Liu et al. | 438/151 |

(Continued)

FOREIGN PATENT DOCUMENTS

| CN | 101859892 | 10/2010 |
| CN | 101969112 | 2/2011 |

(Continued)

OTHER PUBLICATIONS

Li, Kang, Bai, and Shen, A novel network composite cathode of LiFePO4/multiwalled carbon nanotubes with high rate capability for lithium ion batteries, Electrochemistry Communications, vol. 9 (2007) pp. 663-666.*

(Continued)

Primary Examiner — Matthew Daniels
(74) Attorney, Agent, or Firm — Novak Druce Connolly Bove + Quigg LLP

(57) ABSTRACT

A method for making a lithium ion battery cathode is provided. A carbon nanotube source including a plurality of carbon nanotubes is made. A cathode active material including a plurality of cathode active material particles and a solvent is provided. The carbon nanotube source and the cathode active material are added into the solvent, and the solvent with the carbon nanotube source and the cathode active material is shaken using ultrasonic waves. The carbon nanotube source and the cathode active material are then separated from the solvent to obtain a lithium ion battery cathode.

19 Claims, 7 Drawing Sheets

(56) References Cited

U.S. PATENT DOCUMENTS

| | | |
|---|---|---|
| 2010/0051471 A1 | 3/2010 | Meng et al. |
| 2010/0203370 A1* | 8/2010 | Pozin et al. ............... 429/94 |
| 2011/0256451 A1 | 10/2011 | Cui et al. |
| 2011/0262805 A1 | 10/2011 | Wang et al. |

FOREIGN PATENT DOCUMENTS

| | | |
|---|---|---|
| TW | 200644319 | 12/2006 |
| TW | 200919811 | 5/2009 |
| TW | 201010940 | 3/2010 |

OTHER PUBLICATIONS

Xing, Li, Chusuei, and Hull, Sonochemical Oxidation of Multiwalled Carbon Nanotubes, Langmuir, vol. 21 (2005) pp. 4185-4190.*

Ng, et al., Single wall carbon nanotube paper as anode for lithium-ion battery, Electrochimica Acta, vol. 51 (2005), pp. 23-28.*

Ma et al., Dispersion and functionalization of carbon nanotubes for polymer-based nanocomposites: A review, Composites: Part A, vol. 41 (2010), pp. 1345-1367.*

* cited by examiner

METHOD FOR MAKING LITHIUM ION BATTERY CATHODE

CROSS-REFERENCE TO RELATED APPLICATIONS

This application claims all benefits accruing under 35 U.S.C. §119 from China Patent Application No. 201110333540.8, filed on Oct. 28, 2011, in the China Intellectual Property Office, the contents of which are hereby incorporated by reference. The application is also related to copending applications entitled, "METHOD FOR MAKING LITHIUN ION BATTERY ANODE", filed Dec. 29, 2011 Ser. No. 13/340,235; "LITHIUM ION BATTERY ANODE", filed Dec. 29, 2011 Ser. No. 13/340,260.

BACKGROUND

1. Technical Field

The present disclosure relates to a method for making lithium ion battery cathodes, particularly, to a method for making a carbon nanotube based lithium ion battery cathode.

2. Description of Related Art

A typical lithium ion battery mainly includes a cathode, an anode, a separator, and an electrolyte. The cathode usually includes cathode active material, conductive particles, and adhesive. The adhesive is used to bond the cathode active material and conductive particles together, so that the cathode can have a stable structure with a desired shape. The adhesive is usually composed of insulative organic material. The organic material includes polyvinylidene fluoride (PVDF), polyfluortetraethylene (PTFE), or styrene-butadiene rubber (SBR). A mass ratio of the adhesive to the cathode is usually about 10%. Thus, the adhesive would decrease the conductivity and specific capacity of the cathode.

What is needed, therefore, is to provide a method for making a lithium ion battery cathode without adhesive.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
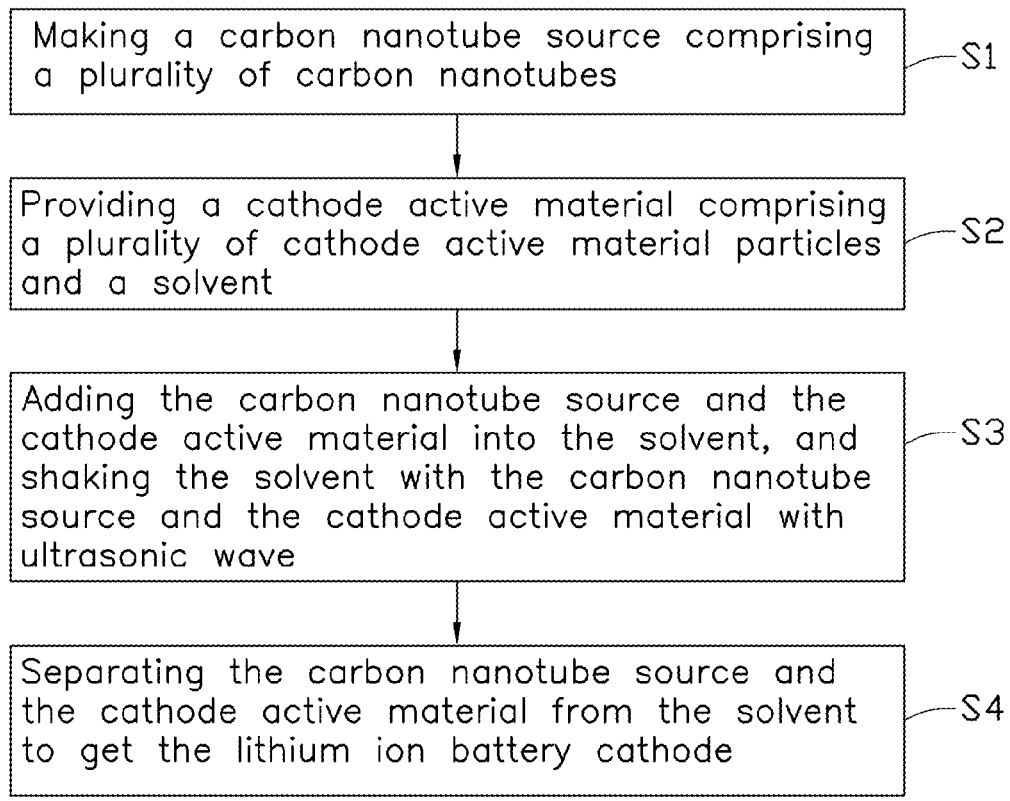
FIG. 1 is a flow chart of one embodiment of a process for making a lithium ion battery cathode.

Referring to FIG. 1, a method for making a lithium ion battery cathode according to one embodiment is provided. The method includes the following steps:

S1: making a carbon nanotube source including a number of carbon nanotubes;

S2: providing a cathode active material including a number of cathode active material particles and a solvent;

S3: adding the carbon nanotube source and the cathode active material into the solvent, and shaking the solvent with the carbon nanotube source and the cathode active material with ultrasonic waves; and S4: separating the carbon nanotube source and the cathode active material from the solvent to obtain a lithium ion battery cathode.

In step S1, the carbon nanotube source can be made of carbon nanotubes. The carbon nanotubes can be single-walled carbon nanotubes, double-walled carbon nanotubes, or multi-walled carbon nanotubes. A diameter of the carbon nanotube can be in a range from about 1 nanometer to about 200 nanometers. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the length of the carbon nanotubes are substantially the same. A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the lithium ion battery cathode stronger. In one embodiment, the carbon nanotube array is a super aligned carbon nanotube array. In the super aligned carbon nanotube array, a length of the carbon nanotubes is almost the same and longer than 300 micrometers. Surfaces of the carbon nanotubes are clean and without impurities. The lithium ion battery cathode made by the above method only includes the carbon nanotube source and the cathode active material.

In step S1, the carbon nanotube array can be made using CVD method, arc discharge method, aerosol method, or any other appropriate method. In one embodiment, a method for making the carbon nanotube array includes:

S11: providing a substantially flat and smooth substrate;

S12: applying a catalyst layer on the substrate;

S13: annealing the substrate with the catalyst layer at a temperature in the range of about 700° C. to about 900° C. in air for about 30 minutes to about 90 minutes;

S14: heating the substrate with the catalyst layer at a temperature in the range from about 500° C. to about 740° C. in a furnace with a protective gas therein; and S15: supplying a carbon source gas to the furnace for about 5 to about 30 minutes and growing a super-aligned array of the carbon nanotubes from the substrate.

In step S11, the substrate can be a P or N-type silicon wafer. In one embodiment, a 4-inch P-type silicon wafer is used as the substrate.

In step S12, the catalyst can be made of iron (Fe), cobalt (Co), nickel (Ni), or any combination alloy thereof.

In step S14, the protective gas can be made up of at least one of nitrogen ($N_2$), ammonia ($NH_3$), and a noble gas.

In step S15, the carbon source gas can be a hydrocarbon gas, such as ethylene ($C_2H_4$), methane ($CH_4$), acetylene ($C_2H_2$), ethane ($C_2H_6$), or any combination thereof.

Figure 2:
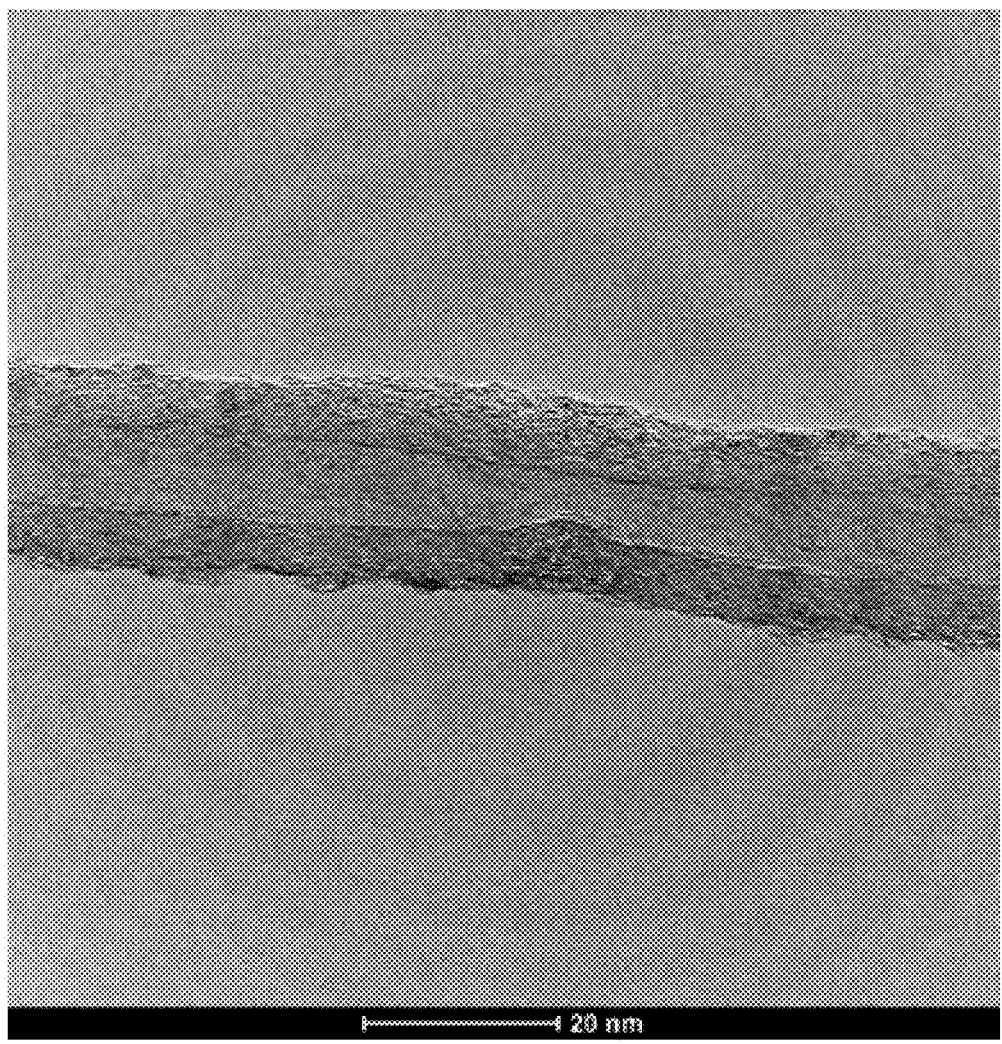
FIG. 2 is a Transmission Electron Microscope (TEM) image of a carbon nanotube of a carbon nanotube source.

The carbon nanotube array formed by the above method is a super aligned carbon nanotube array. Referring to FIG. 2, a carbon nanotube of the carbon nanotube array is almost pure, and a surface of the carbon nanotube is clean.

In the step S2, the cathode active material can be doped or undoped spinel lithium manganese oxide (e.g., $LiMn_2O_4$), layer-shaped lithium manganese oxide (e.g., $LiMnO_2$), lithium nickel oxide (e.g., $LiNiO_2$), lithium cobalt oxide (e.g., $LiCoO_2$), lithium iron phosphate (e.g., $LiFePO_4$), lithium nickel cobalt manganese oxide (e.g., $LiNi_{1/3}CO_{1/3}Mn_{1/3}O_2$), lithium nickel cobalt oxide (e.g., $LiNi_{0.8}CO_{0.2}O_2$), or any combination thereof. A shape of the cathode active material particles is not limited, and can be irregular or regular. A diameter of the cathode active material particles can be in a range from about 10 nanometers (nm) to about 100 micrometers (μm). In one embodiment, the cathode active material particles can be lithium cobalt oxide particles having a diameter less than 15 μm.

In the step S2, the solvent can be ethanol, glycol, acetone, N-Methyl-2-pyrrolidone, water or combination thereof. In one embodiment, the solvent is ethanol. The solvent is contained in a container, such as a beaker.

In the step S3, an order of adding the carbon nanotube source and the cathode active material is not limited. In one embodiment, the carbon nanotube source can be added into the solvent first, and then the cathode active material is added. In another embodiment, the cathode active material is added into the solvent first, and then the carbon nanotube source is added. In still another embodiment, the cathode active material and the carbon nanotube source are added into the solvent at the same time.

In step S3, the carbon nanotube source and the cathode active material form a mixture. A weight percentage of the carbon nanotubes in the mixture can be in a range from about 0.1% to about 20%. In some embodiments, the weight percentage of the carbon nanotubes can be in a range from about 1% to about 10%, such as 3%, 5% or 8%. In one embodiment, a weight ratio between the carbon nanotube source and the cathode active material is about 0.2:8, and the he weight percentage of the carbon nanotubes is about 2.4%.

In step S3, a power of the ultrasonic wave can be in a range from about 400 W to about 1500 W. In some embodiments, the power is in a range from about 800 W to about 1000 W. A time of shaking with the ultrasonic wave can range from about 2 minutes to about 300 minutes. In some embodiments, the shaking time ranges from about 5 minutes to about 10 minutes. The solvent with the carbon nanotube source and the cathode active material can be shaken with ultrasonic waves continuously or at intervals. The interval of the ultrasonic waves is alternating between a working status for a time T1, and a rest status for a time T2. The time T1 and the time T2 can be the same or different. A sum of the time T1 can be in a range from about 2 minutes to about 300 minutes.

Figure 3:
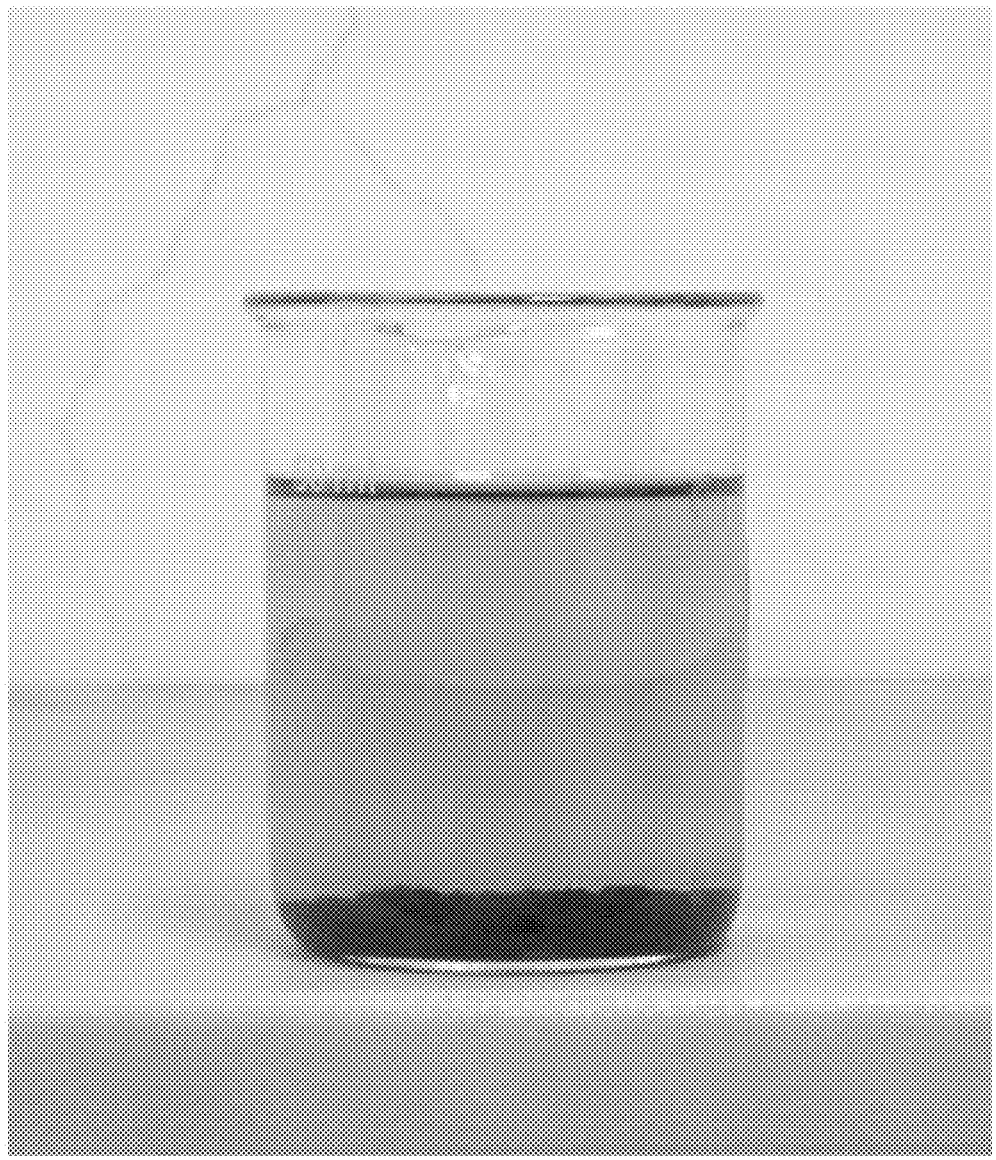
FIG. 3 is a photo showing a mixture including the carbon nanotube source and cathode active material particles deposited on a bottom of a solvent in the process for making the lithium ion battery cathode.
Figure 4:
FIG. 4 is a photo showing a mixture including carbon blacks and cathode active material particles suspended in a solvent in a contrast experiment.

In step S4, after the solvent with the carbon nanotube source and the cathode active material is shaken, the carbon nanotubes in the carbon nanotube source and the cathode active material particles in the cathode active material combine with each other to form mixture. The mixture consists of the carbon nanotubes and cathode active material particles. The solvent with the mixture is kept still for about 1 minute to about 20 minutes. The mixture will deposit to a bottom of the solvent. Referring to FIG. 3, in one embodiment, after the solvent with the mixture has been kept still for about 10 minutes, the mixture will have deposited to the bottom of the solvent. Carbon nanotubes or cathode active material particles will be suspended in the solvent. After the solvent with the carbon nanotube source and the cathode active material is shaken, the carbon nanotubes entangled with each other to form a net structure. The cathode active material particles are wrapped by the net structure and attached on the surface of the carbon nanotubes to form an integrity mixture. The cathode active material particles have a larger density than the solvent, and as such, the integrity mixture can be deposited to the bottom of the solvent. After the mixture has deposited to the bottom of the solvent, the solvent can be absorbed from the container by a pipe, thereby separating the mixture from the solvent. Referring to FIG. 4, in a different experiment, a number of carbon blacks and the cathode active material particles are added into the solvent, and the solvent is shaken with ultrasonic waves at the same period of time. The solvent is kept with the mixture of the carbon blacks and the cathode active material particles for about 5 hours. The mixture was found to still be suspended in the solvent. That is, the carbon blacks and the cathode active material particles could not form an integrated mixture. Although the carbon blacks and the cathode active material particles were separated from the solvent, they could not from an integrated structure with enough strength, and therefore cannot be used as a lithium ion battery cathode.

In step S4, after the carbon nanotube source and the cathode active material are separated from the solvent, the mixture of the carbon nanotube source and the cathode active material can be dried at a room temperature or at a temperature from about 25 centigrade to about 80 centigrade. In one embodiment, the mixture is dried at about 70 centigrade. After the mixture is dried, the mixture can be cut directly to form the lithium ion battery cathode. In other embodiments, the mixture can be pressed and then cut to form the lithium ion battery cathode. A thickness of the lithium ion battery cathode can be larger than 10 micrometers, although the lithium ion battery cathode with small thickness of about 10 micrometers is still sufficiently strong to satisfy its application.

Figure 5:
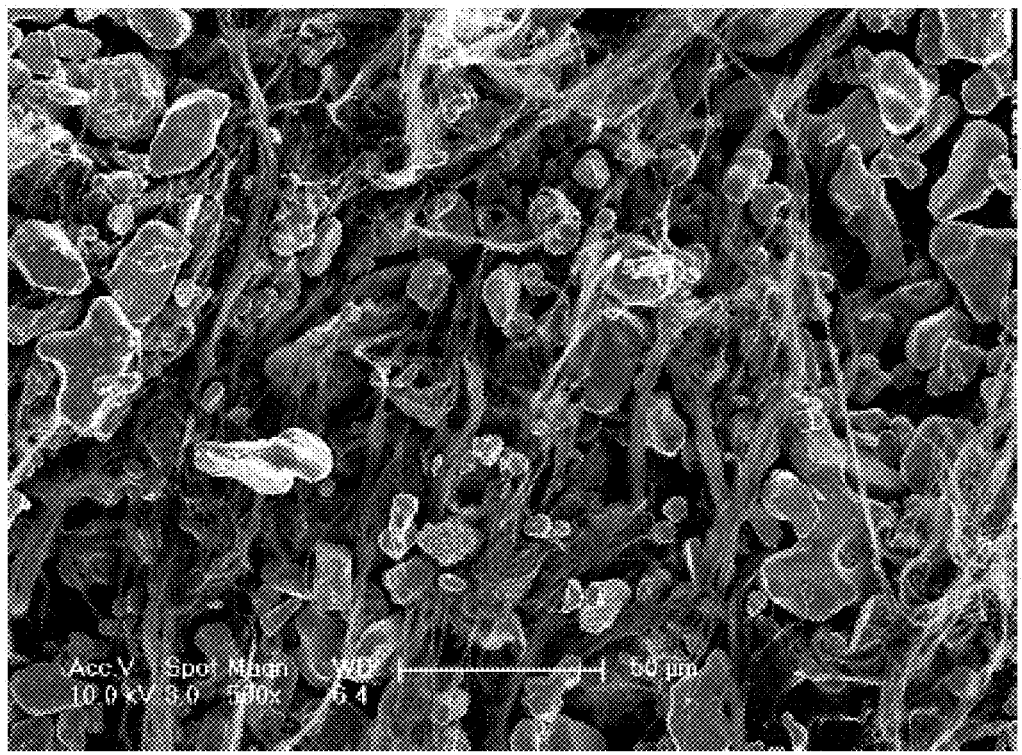
FIG. 5 is a Scanning Electron Microscope (SEM) image of one embodiment of a lithium ion battery cathode.
Figure 6:
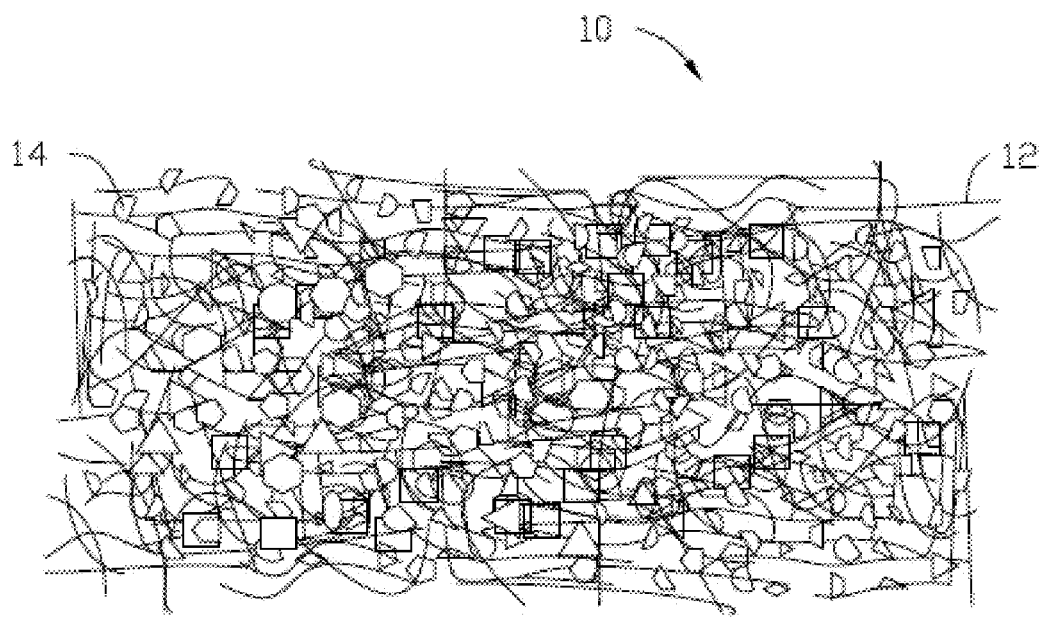
FIG. 6 is a structural schematic view of the lithium ion battery cathode of FIG. 5.

Referring to FIGS. 5 and 6, one embodiment of a lithium ion battery cathode 10 includes a plurality of cathode active material particles 14 and a plurality of carbon nanotubes 12. The plurality of carbon nanotubes 12 is entangled with each other to form a net structure. The plurality of cathode active material particles 14 is wrapped by the net structure and attached on the surface of the carbon nanotubes 12.

The carbon nanotubes 12 are entangled with each other and combined by van der Waals attractive force therebetween, thereby forming an integral continuous net structure having a plurality of micropores defined by the carbon nanotubes 12. The net structure can be a free-standing structure. The term "free-standing structure" means that the net structure can sustain the weight of itself when it is hoisted by a portion thereof without any significant damage to its structural integrity. So, if the net structure is placed between two separate supports, a portion of the net structure not in contact with the two supports, would be suspended between the two supports and still maintain structural integrity. The free-standing structure is different from powder which would fall if the powder is not in contact with the support. In addition, the carbon nanotubes 12 are disorderly aligned. A density distribution of the carbon nanotubes 12 in the net structure is substantially the same, or mass ratios of the carbon nanotubes 12 to the lithium ion battery cathode 10 per unit volume are substantially the same. Thus, a resistivity of the lithium ion battery cathode 10 can be substantially uniform.

The carbon nanotubes 12 in the lithium ion battery cathode 10 can serve as a conductive material and microporous carrier to support and fix the cathode active material particles 14. Thus, even without using an adhesive, the lithium ion battery cathode 10 can be an integrative stable structure due to the net structure composed of the carbon nanotubes 12. The cathode active material particles 14 are uniformly distributed in the net structure. Specifically, the cathode active material particles 14 can be adhered on or entangled by the carbon nanotubes, or the cathode active material particles 14 can be wrapped by the carbon nanotubes. The cathode active material particles 14 and the carbon nanotubes are in contact with each other without adhesive therebetween. The cathode active material particles 14 and the carbon nanotubes are fixed together by van der Waals attractive force therebetween.

Figure 7:
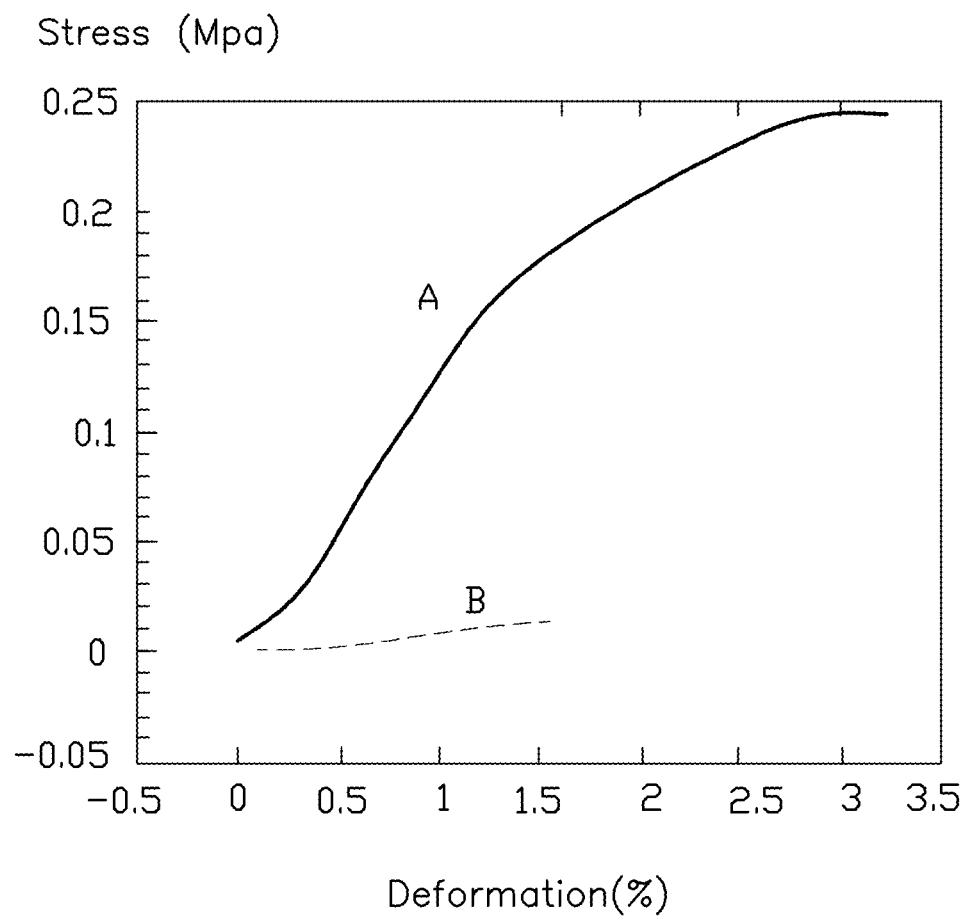
FIG. 7 is a graph showing stress-strain curves of the lithium ion battery cathode of FIG. 1 and a lithium ion battery cathode with adhesive.

Referring to FIG. 7, curve A represents a stress-strain curve of one embodiment of the lithium ion battery cathode 10 without the adhesive, and curve B represents a stress-strain curve of a conventional lithium ion battery cathode with the polyfluortetraethylene (PTFE) adhesive. In the embodiment, the lithium ion battery cathode 10 only includes the cathode active material particles 14 and the carbon nanotubes 12. The cathode active material particles 14 are lithium cobalt oxide particles. The mass ratio of the lithium cobalt oxide particles to the carbon nanotubes 12 is 8:0.2. The conventional lithium ion battery cathode with the PTFE adhesive includes lithium cobalt oxide particles, carbon black, and PTFE adhesive. The mass ratio of the lithium cobalt oxide particles to carbon black to polyfluortetraethylene adhesive is about 8:0.5:1. As shown in FIG. 7, strength of the lithium ion battery cathode 10 is much higher than the strength of the conventional lithium ion battery cathode with the PTFE adhesive. Thus, although the lithium ion battery cathode 10 does not include the adhesive, the lithium ion battery cathode 10 still has a good strength for satisfying the application.

The above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making a lithium ion battery cathode comprising:
    making a carbon nanotube source comprising a plurality of carbon nanotubes;
    providing a cathode active material and a solvent, wherein the cathode active material comprises a plurality of cathode active material particles;
    adding the carbon nanotube source and the cathode active material into the solvent, and shaking the solvent with the carbon nanotube source and the cathode active material using ultrasonic waves to form a mixture in the solvent free of adhesive, and the mixture comprises the carbon nanotube source and the cathode active material;
    allowing the solvent to deposit the mixture at a bottom of the solvent by keeping the solvent still; and
    separating the mixture deposited at the bottom from the solvent to obtain the lithium ion battery cathode.

2. The method of claim 1, wherein the step of making the carbon nanotube source comprises making a carbon nanotube array on a substrate, and scratching the carbon nanotube array from the substrate.

3. The method of claim 2, wherein the step of making the carbon nanotube array comprises substeps of:
    providing a smooth substrate;
    applying a catalyst layer on the substrate;
    annealing the substrate with the catalyst layer at a temperature in the range of about 700° C. to about 900° C. in air for about 30 minutes to about 90 minutes;
    heating the substrate with the catalyst layer at a temperature in the range from about 500° C. to about 740° C.; and
    supplying a carbon source gas to the furnace for about 5 minutes to about 30 minutes and growing a super-aligned array of the carbon nanotubes from the substrate.

4. The method of claim 1, the lithium ion battery cathode consists essentially of the carbon nanotube source and the cathode active material.

5. The method of claim 1, wherein the cathode active material consists of the plurality of cathode active material particles.

6. The method of claim 5, wherein the cathode active material is spinel lithium manganese oxide, layered lithium manganese oxide, lithium nickel oxide, lithium cobalt oxide, lithium iron phosphate, lithium nickel manganese oxide, lithium nickel cobalt oxide, lithium nickel cobalt manganese oxide, or any combination thereof.

7. The method of claim 1, wherein the solvent is ethanol, glycol, acetone, N-Methyl-2-pyrrolidone, water, or combination thereof.

8. The method of claim 1, wherein a power of the ultrasonic waves is in a range from about 400 W to about 1500 W.

9. The method of claim 8, wherein a power of the ultrasonic waves is in a range from about 800 W to about 1000 W.

10. The method of claim 1, wherein the solvent with the carbon nanotube source and the cathode active material is shaken with the ultrasonic waves for about 2 minutes to about 30 minutes.

11. The method of claim 1, wherein the solvent is kept still for about 1 minute to about 20 minutes.

12. The method of claim 11, wherein the solvent is absorbed by a pipe to separate the solvent and the mixture.

13. The method of claim 1, wherein after separating the mixture from the solvent, the mixture is dried at a temperature of about 25 centigrade to about 80 centigrade.

14. The method of claim 13, further comprising a pressing method pressing the mixture after the mixture is dried.

15. The method of claim 1, wherein a length of the plurality of carbon nanotubes is greater than 300 micrometers.

16. The method of claim 1, wherein the plurality of carbon nanotubes are free of functional groups.

17. A method for making a lithium ion battery cathode comprising:
    making a carbon nanotube source comprising a plurality of carbon nanotubes free of functional groups;
    providing a cathode active material and a solvent, wherein the cathode active material comprises a plurality of cathode active material particles;
    mixing the carbon nanotube source comprising a plurality of carbon nanotubes free of functional groups and the cathode active material in the solvent;
    agitating the solvent with the carbon nanotube source comprising the plurality of carbon nanotubes free of functional groups and the cathode active material using ultrasonic waves;

depositing the carbon nanotube source and the cathode active material by keeping still the solvent to form a deposition at a bottom of the solvent, and the deposition being free of adhesive; and separating the deposition from the solvent to obtain the lithium ion battery cathode.

18. A method for making a lithium ion battery cathode comprising:

providing a plurality of carbon nanotubes free of functional groups, a plurality of cathode active material particles, and a solvent;

adding the plurality of carbon nanotubes free of functional groups and the plurality of cathode active material particles into the solvent;

shaking the solvent with the plurality of carbon nanotubes free of functional groups and the plurality of cathode active material particles using ultrasonic waves to entangle the plurality of carbon nanotubes with each other to form a net structure, wrap the plurality of cathode active material particles with the net structure, and form a mixture in the solvent, wherein the mixture is free of adhesive and comprises the plurality of carbon nanotubes free of functional groups and the plurality of cathode active material particles;

allowing the solvent to deposit the mixture at a bottom of the solvent; and separating the mixture from the solvent to obtain the lithium ion battery cathode.

19. The method of claim 18, wherein the mixture consists essentially of the plurality of carbon nanotubes free of functional groups and the plurality of cathode active material particles.

* * * * *